United States Patent [19]

Matsumura et al.

[11] Patent Number: 5,789,529
[45] Date of Patent: Aug. 4, 1998

[54] POLYAMIDE RESIN COMPOSITION AND TUBULAR MOLDING COMPRISING THE SAME

[75] Inventors: Takenobu Matsumura; Noriyuki Isobe, both of Yamaguchi; Kanzou Tabata; Satoshi Kotera, both of Osaka, all of Japan

[73] Assignee: UBE Industries, Ltd., Yamaguchi, Japan

[21] Appl. No.: 660,583

[22] Filed: Jun. 11, 1996

[30] Foreign Application Priority Data

Jun. 13, 1995 [JP] Japan .................... 7-146083
Jun. 13, 1995 [JP] Japan .................... 7-146084

[51] Int. Cl.$^6$ .................... C08K 69/08; C08K 5/00; C08L 77/00
[52] U.S. Cl. .................... 528/310; 528/170; 528/322; 528/332; 528/488; 525/425; 524/514; 524/600; 524/606
[58] Field of Search .................... 525/425; 524/606, 524/514, 600; 528/488, 310, 332, 322, 170

[56] References Cited

U.S. PATENT DOCUMENTS

| | | | |
|---|---|---|---|
| 2,757,156 | 7/1956 | Dazzi | 524/168 |
| 4,174,358 | 11/1979 | Epstein | 525/425 |
| 4,251,424 | 2/1981 | Pagilagan | 525/84 |
| 4,399,246 | 8/1983 | Hyde | 524/169 |
| 4,745,143 | 5/1988 | Mason et al. | 524/98 |
| 4,801,633 | 1/1989 | Mason et al. | 524/98 |

FOREIGN PATENT DOCUMENTS

| | | |
|---|---|---|
| 0 212 085 A2 | 3/1987 | European Pat. Off. . |
| 27 16 004 | 10/1978 | Germany . |
| 50-95360 | 7/1975 | Japan . |
| 62-15258 | 1/1987 | Japan . |
| 62-283151 | 12/1987 | Japan . |
| 1-185362 | 7/1989 | Japan . |
| 0 388 583 A1 | 9/1990 | Japan . |
| 5-320504 | 12/1993 | Japan . |
| 6-228436 | 8/1994 | Japan . |
| 561701 | 6/1944 | United Kingdom . |

OTHER PUBLICATIONS

Communication dated Sep. 22, 1997 from European Patent Office concerning counterpart European Application No. 96304432.6 (3 pages).

R. Vieweg et al., "Kunststoff-Handbuch, Band VI, Polyamide", (1966), pp. 238-239 and 242-243.

*Primary Examiner*—P. Hampton-Hightower
*Attorney, Agent, or Firm*—Panitch Schwarze Jacobs & Nadel, P.C.

[57] ABSTRACT

A polyamide resin composition comprising: (A) 100 parts by weight of at least one member selected from a polyamide-11 resin and a polyamide-12 resin; optionally (B) from 3 to 30 parts by weight of a modified polyolefin resin; and (C) from 3 to 25 parts by weight of a plasticizer mixture comprising a plasticizer (C1) and a plasticizer (C2). The modified polyolefin resin (B) is either a modified polyolefin (B1) which is a copolymer of an olefin comprising at least one of ethylene and propylene, with an $\alpha,\beta$-unsaturated carboxylic acid or a derivative thereof, or a modified polyolefin (B2) which is a graft polymer obtained by grafting an $\alpha,\beta$-unsaturated carboxylic acid or a derivative thereof onto a copolymer of an olefin comprising at least one of ethylene and propylene. The plasticizer (C1) has a solidifying point of $-40°$ C. or lower and is at least one member selected from the group consisting of phthalic esters, fatty acid esters, polyhydric alcohol esters, phosphoric esters, trimellitic esters, and epoxy plasticizers, and the plasticizer (C2) is at least one member selected from the group consisting of benzenesulfonic acid alkylamides, toluenesulfonic acid alkylamides, and alkyl hydroxybenzoates.

16 Claims, No Drawings

5,789,529

POLYAMIDE RESIN COMPOSITION AND TUBULAR MOLDING COMPRISING THE SAME

FIELD OF THE INVENTION

The present invention relates to a polyamide resin composition which has flexibility and excellent low-temperature impact resistance and is suitable for use as a molding material for producing tubes, pipes, or the like. This invention also relates to a tubular molding comprising the composition.

BACKGROUND OF THE INVENTION

Polyamide-11 resins and polyamide-12 resins have high chemical and heat resistance and high stability to dimensional change with water absorption, and have been used in applications such as hoses and tubes in various industrial fields. However, there are many cases where in applications such as hoses and tubes, the flexibility inherent in polyamide-11 resins and polyamide-12 resins is insufficient and a higher degree of flexibility is required.

The generally employed method for imparting a higher degree of flexibility to polyamide-11 resins and polyamide-12 resins is to incorporate thereinto a plasticizer having relatively good compatibility with these polyamide resins. The plasticizers used for this purpose include toluenesulfonic acid alkylamides, benzenesulfonic acid alkylamides, and alkyl hydroxybenzoates (as disclosed, e.g., in JP-A-50-95360, JP-A-62-283151, and JP-A-1-185362). (The term "JP-A" as used herein means an "unexamined published Japanese patent application.")

However, polyamide-11 or polyamide-12 resin compositions containing such plasticizers have a drawback that they are considerably inferior in low-temperature impact resistance to those polyamide resins not containing any plasticizer. For example, the plasticizer-containing compositions are incapable of passing the "Impact Test for Tubes at −40° C." as provided for in the Society of Automotive Engineers (SAE) standard, J844, a U.S. standard for automotive tubes. In particular, tube-molding speeds of 30 m/min or higher result in considerably insufficient low-temperature impact resistance.

Since tube-molding speeds tend to increase more and more recently, improvement in the low-temperature impact resistance of tubes obtained through high-speed (30 m/min or higher) molding from materials which have been rendered flexible with a plasticizer is becoming an important subject.

A known method for improving impact resistance is to incorporate into a polyamide resin a polyolefin modified with an unsaturated carboxylic acid or the like.

For example, in JP-A-62-15258 is disclosed a salt-resistant polyamide composition comprising a polyamide, a water-insoluble plasticizer in an amount of 2 to 30 wt % based on the polyamide amount, and a copolymer of at least one α-olefin having 1 to 8 carbon atoms and a monomer selected from unsaturated carboxylic acids having 3 to 8 carbon atoms and derivatives of these acids, in an amount of 5 to 100 wt % based on the polyamide amount. (The term "wt %" used herein means "% by weight".) In JP-A-5-320504 is proposed a polyamide resin composition suitable for use in producing blow-molded articles and comprising from 40 to 80 wt % nylon resin, from 10 to 50 wt % modified polyolefin resin which is either a copolymer of an olefin consisting mainly of ethylene and/or propylene with an α,β-unsaturated carboxylic acid or a derivative thereof or a graft polymer obtained by grafting an α,β-unsaturated carboxylic acid or a derivative thereof onto a polymer of the olefin, and from 2 to 15 wt % ester of p- or o-hydroxybenzoic acid with a branched aliphatic alcohol having 12 to 22 carbon atoms, the amount of each component being based on the total amount of the composition.

In JP-A-6-228436 is proposed a thermoplastic resin composition which comprises from 10 to 20 parts by weight of a propylene polymer, from 40 to 60 parts by weight of a polyamide, and from 50 to 20 parts by weight of a modified ethylene/α-olefin copolymer obtained by grafting from 0.01 to 5 parts by weight of a graft monomer selected from unsaturated carboxylic acids and derivatives thereof onto 100 parts by weight of an ethylene/α-olefin copolymer having a crystallinity as determined with X-rays of 0 to 50% and an ethylene content of 40 to 93 mol %, and which further contains from 2 to 20 parts by weight of a plasticizer for the polyamide per 100 parts by weight of the sum of the propylene polymer, the polyamide, and the modified ethylene/α-olefin copolymer.

However, the polyamide-11 or polyamide-12 resin compositions according to the known techniques such as those described above have not been designed for use as a tube, in particular, for use as a molding material to be molded into a tube or the like at a high speed of 30 m/min or higher. Illustratively stated, although the amount of a modified polyolefin to be incorporated for improving impact resistance should be generally at least about 15 wt %, this not only impairs the heat resistance inherent in the polyamide resin but results in problems, for example, that the melt has insufficient elongation and hence breaks in high-speed (e.g., 30 m/min or higher) molding in the period of from extrusion from the die to solidification, and that the melt undergoes considerable die swelling and hence gives a molding with poor dimensional stability. Consequently, it has been difficult to use the prior art compositions in high-speed molding for producing a tube or the like.

Further drawbacks of the above-described known techniques using a plasticizer are that since the compatibility between the plasticizer and the polyamide-11 or polyamide-12 resin is insufficient, the plasticizer bleeds from the molding to make the molding surface tacky, and that the plasticizer vaporizes off during long-term use of the molding at a high temperature and, as a result, the molding comes to have insufficient flexibility.

SUMMARY OF THE INVENTION

An object of the present invention is to provide a polyamide-11 resin composition and/or polyamide-12 resin composition which has excellent flexibility, has intact low-temperature impact resistance even when molded into a tube or the like at a high speed of 30 m/min or higher, in particular 50 m/min or higher, and gives a molding which, even when used at a high temperature for long, retains its nontacky surface and intact flexibility.

Another object of the present invention is to provide a tubular molding comprising the composition.

The above and other objects and effects of the present invention will be more apparent from the following description.

The present inventors made intensive studies in order to eliminate the problems which are encountered when the known techniques described above are used in subjecting a polyamide-11 resin or a polyamide-12 resin to applications such as hoses and tubes, to thereby accomplish the objects described above. As a result, it has been found that a polyamide resin composition having excellent flexibility and capable of giving, even through molding at a high speed (e.g., 30 m/min or higher, in particular 50 m/min or higher), a tube or the like having sufficient low-temperature impact resistance and intact flexibility and a tubular molding comprising the composition can be obtained by compounding a polyamide-11 resin and/or a polyamide-12 resin with a specific amount of a specific plasticizer mixture. The present invention has been completed based on this finding.

The present inventors have further found that a polyamide resin composition capable of giving a molding which does not come to have surface tackiness even in long-term use at a high temperature and a tubular molding comprising the composition can be obtained by compounding at least either of a polyamide-11 resin and a polyamide-12 resin (hereinafter referred to as "a polyamide-11 resin and/or a polyamide-12 resin") with a specific amount of a specific plasticizer mixture and with a specific amount of a modified polyolefin which is either a copolymer of an olefin with an α,β-unsaturated carboxylic acid or a derivative thereof or a graft polymer obtained by grafting an α,β-unsaturated carboxylic acid or a derivative thereof onto an olefin copolymer.

The present invention relates to, as a first embodiment, a polyamide resin composition comprising:

(A) 100 parts by weight of at least one member selected from a polyamide-11 resin and a polyamide-12 resin; and (C) from 3 to 25 parts by weight of a plasticizer mixture comprising from 60 to 95 wt % of a plasticizer (C1) and from 5 to 40 wt % of a plasticizer (C2), based on the total amount of said plasticizer mixture (C).

The present invention also relates to, as a second embodiment, a polyamide resin composition comprising:

(A) 100 parts by weight of at least one member selected from a polyamide-11 resin and a polyamide-12 resin;

(B) from 3 to 30 parts by weight of a modified polyolefin resin; and (C) from 3 to 25 parts by weight of a plasticizer mixture comprising from 5 to 95 wt % of a plasticizer (C1) and from 5 to 95 wt % of a plasticizer (C2), based on the total amount of said plasticizer mixture (C).

The modified polyolefin resin (B) is either a modified polyolefin (B1) which is a copolymer of an olefin comprising at least one of ethylene and propylene, with an α,β-unsaturated carboxylic acid or a derivative thereof, or a modified polyolefin (B2) which is a graft polymer obtained by grafting an α,β-unsaturated carboxylic acid or a derivative thereof onto a copolymer of an olefin comprising at least one of ethylene and propylene.

The plasticizer (C1) has a solidifying point of −40° C. or lower and is at least one member selected from the group consisting of phthalic esters, fatty acid esters, polyhydric alcohol esters, phosphoric esters, trimellitic esters, and epoxy plasticizers.

The plasticizer (C2) is at least one member selected from the group consisting of benzenesulfonic acid alkylamides, toluenesulfonic acid alkylamides, and alkyl hydroxybenzoates.

The present invention further relates to a tubular molding comprising the polyamide resin composition of the first embodiment of the present invention or the polyamide resin composition of the second embodiment of the present invention.

DETAILED DESCRIPTION OF THE INVENTION

Examples of the polyamide-11 resin and/or polyamide-12 resin (A) used in the present invention include polyamide resins obtained by the polycondensation of aminocarboxylic acids such as 11-aminoundecanoic acid and 12-aminododecanoic acid, polyamide resins obtained from lactams such as undecanelactam and dodecanelactam, copolyamide resins obtained from these ingredients, and mixtures of such polyamide and/or copolyamide resins. Although these polyamide resins are not particularly limited in molecular weight, the number-average molecular weight thereof is generally 3,000 or higher, preferably 4,700 or higher, and more preferably 7,800 or higher.

Number-average molecular weights lower than 3,000 are undesirable for these polyamide resins, because too low a melt viscosity results, so that considerable drawdown occurs during tube molding to make shape impartation difficult. In order to avoid this undesirable phenomenon without fail, those polyamide resins desirably have a number-average molecular weight within the preferred range, in particular within the more preferred range.

The plasticizer for use in the present invention should be a plasticizer mixture (C) comprising a plasticizer (C1) having a solidifying point of −40° C. or lower and being at least one member selected from the group consisting of phthalic esters, fatty acid esters, polyhydric alcohol esters, phosphoric esters, trimellitic esters, and epoxy plasticizers, and a plasticizer (C2) being at least one member selected from the group consisting of benzenesulfonic acid alkylamides, toluenesulfonic acid alkylamides, and alkyl hydroxybenzoates.

If the plasticizer (C1), having a solidifying point of −40° C. or lower, is used alone, not only the effect of imparting flexibility to the polyamide-11 resin and/or polyamide-12 resin (A) is insufficient even when the plasticizer (C1) is incorporated in an increased amount, but also the polyamide resin composition obtained has drawbacks such as reduced heat resistance. On the other hand, if the plasticizer (C2), which is a benzenesulfonic acid alkylamide, a toluenesulfonic acid alkylamide, an alkyl hydroxybenzoate, or a mixture thereof, is used alone, the molding such as, e.g., tube, obtained from the resulting composition through high-speed (30 m/min or high) molding has too poor low-temperature impact strength to pass a standard test such as, e.g., SAE J844 mentioned hereinabove, although sufficient flexibility can be imparted to the polyamide-11 resin and/or polyamide-12 resin (A).

Consequently, the plasticizer for use in the present invention should be a plasticizer mixture (C) comprising the plasticizer (C1) and the plasticizer (C2), as described above.

In the first embodiment of the present invention, the amount of the plasticizer (C1) based on the total amount of the plasticizer mixture (C) is from 60 to 95 wt %, preferably from 65 to 95 wt %, especially preferably from 70 to 95 wt %, and the amount of the plasticizer (C2) based on the total amount of the plasticizer mixture (C) is from 5 to 40 wt %, preferably from 5 to 35 wt %, especially preferably from 5 to 30 wt %.

In the second embodiment of the present invention, the polyamide resin composition comprises the polyamide-11 resin and/or polyamide-12 resin (A) and the plasticizer mixture (C), as well as the modified polyolefin (B) which is either a modified polyolefin (B1) which is a copolymer of an olefin comprising at least one of ethylene and propylene, with an α,β-unsaturated carboxylic acid or a derivative thereof, or a modified polyolefin (B2) which is a graft polymer obtained by grafting an α,β-unsaturated carboxylic acid or a derivative thereof onto a copolymer of an olefin comprising at least one of ethylene and propylene.

In the second embodiment of the present invention, the amount of the plasticizer (C1) based on the total amount of the plasticizer mixture (C) is from 5 to 95 wt %, preferably from 5 to 80 wt %, especially preferably from 5 to 60 wt %, and the amount of the plasticizer (C2) based on the total amount of the plasticizer mixture (C) is from 5 to 95 wt %, preferably from 20 to 95 wt %, especially preferably from 40 to 95 wt %.

The content of the plasticizer (C1) in the plasticizer mixture (C) lower than the lower limit specified above are undesirable in that the polyamide resin composition obtained and the tubular molding comprising the composition have insufficient low-temperature impact resistance. The content thereof exceeding the upper limit specified above are undesirable in that the polyamide resin composition obtained and the tubular molding comprising the composition have insufficient flexibility.

As stated hereinabove, the plasticizer (C1) as one component of the plasticizer mixture (C) used in the present invention may be a single compound or a mixture of two or more compounds each having a solidifying point of −40° C. or lower and selected from the group consisting of phthalic esters, fatty acid esters, polyhydric alcohol esters, phosphoric esters, trimellitic esters, and epoxy plasticizers, and the plasticizer (C2) as the other component of the plasticizer mixture (C) may be a single compound or a mixture of two or more compounds each selected from the group consisting of benzenesulfonic acid alkylamides, toluenesulfonic acid alkylamides, and alkyl hydroxybenzoates.

Examples of the phthalic esters for use as the plasticizer (C1) include diethyl phthalate (solidifying point: −40° C.), diisobutyl phthalate (solidifying point: −50° C.), diheptyl phthalate (solidifying point: −46° C.), di-2-ethylhexyl phthalate (solidifying point: −55° C.), diisodecyl phthalate (solidifying point: −53° C.), butyl benzyl phthalate (solidifying point: −40° C.), diisononyl phthalate (solidifying point: −45° C.), and di-2-ethylhexyl tetrahydrophthalate (solidifying point: −57° C.).

Examples of the fatty acid esters for use as the plasticizer (C1) include di-2-ethylhexyl adipate (solidifying point: −68° C.), diisodecyl adipate (solidifying point: −70° C.), diisononyl adipate (solidifying point: −63° C.), di-2-ethylhexyl sebacate (solidifying point: −65° C.), di-2-ethylhexyl azelate (solidifying point: −65° C.), bis-2-ethylhexyl dodecanedioate (solidifying point: −55° C.), bis-2-ethylhexyl fumarate (solidifying point: −58° C.), dibutyl maleate (solidifying point: −85° C.), acetylbutyl ricinoleate (solidifying point: −65° C.), tributyl acetylcitrate (solidifying point: −80° C.), and 2-ethylhexyl acetate (solidifying point: −55° C.).

Examples of the polyhydric alcohol esters for use as the plasticizer (C1) include 2,2,4-trimethyl-1,3-pentanediol monoisobutyrate (solidifying point: −50° C.), 2,2,4-trimethyl-1,3-pentanediol diisobutyrate (solidifying point: −70° C.), glycerol triacetate (solidifying point: −62° C.), and glycerol tributyrate (solidifying point: −75° C.).

Examples of the phosphoric esters for use as the plasticizer (C1) include trimethyl phosphate (solidifying point: −70° C.), triethyl phosphate (solidifying point: −56° C.), tributyl phosphate (solidifying point: −80° C.), tri-2-ethylhexyl phosphate (solidifying point: −70° C.), tributoxyethyl phosphate (solidifying point: −70° C.), and 2-ethylhexyldiphenyl phosphate (solidifying point: −54° C.).

Examples of the trimellitic esters for use as the plasticizer (C1) include tributyl trimellitate (solidifying point: −60° C.), tri-2-ethylhexyl trimellitate (solidifying point: −43° C.), and tri-n-octyl trimellitate (solidifying point: −50° C.).

Examples of the epoxy plasticizers for use as the plasticizer (C1) include di-n-octyl epoxyhexahydrophthalate (solidifying point: −47° C.) and di-2-ethylhexyl epoxyhexahydrophthalate (solidifying point: −40° C.).

Preferred of the above-enumerated plasticizers for use as the plasticizer (C1) in the present invention include phthalic esters such as diisobutyl phthalate, diheptyl phthalate, di-2-ethylhexyl phthalate, and diisodecyl phthalate, fatty acid esters such as di-2-ethylhexyl adipate, isodecyl adipate, di-2-ethylhexyl sebacate, and di-2-ethylhexyl azelate, polyhydric alcohol esters such as 2,2,4-trimethyl-1,3-pentanediol monoisobutyrate and 2,2,4-trimethyl-1,3-pentanediol diisobutyrate, and phosphoric esters such as tributyl phosphate, tri-2-ethylhexyl phosphate, and tributoxyethyl phosphate.

Especially preferred of those plasticizers preferably used as the plasticizer (C1) in the present invention are phthalic esters such as diisobutyl phthalate, di-2-ethylhexyl phthalate, and diisodecyl phthalate, fatty acid esters such as di-2-ethylhexyl adipate, di-2-ethylhexyl sebacate, and di-2-ethylhexyl azelate, polyhydric alcohol esters such as 2,2,4-trimethyl-1,3-pentanediol monoisobutyrate and 2,2,4-trimethyl-1,3-pentanediol diisobutyrate, and phosphoric esters such as tri-2-ethylhexyl phosphate.

Examples of the benzenesulfonic acid alkylamides for use as the plasticizer (C2) include benzenesulfonic acid propylamide, benzenesulfonic acid butylamide, and benzenesulfonic acid 2-ethylhexylamide.

Examples of toluenesulfonic acid alkylamides for use as the plasticizer (C2) include N-ethyl-o- or N-ethyl-p-toluenesulfonic acid butylamide and N-ethyl-o- or N-ethyl-p-toluenesulfonic acid 2-ethylhexylamide.

Examples of the alkyl hydroxybenzoates for use as the plasticizer (C2) include ethylhexyl o- or p-hydroxybenzoate, hexyldecyl o- or p-hydroxybenzoate, ethyldecyl o- or p-hydroxybenzoate, octyloctyl o- or p-hydroxybenzoate, decyldodecyl o- or p-hydroxybenzoate, methyl o- or p-hydroxybenzoate, butyl o- or p-hydroxybenzoate, hexyl o- or p-hydroxybenzoate, n-octyl o- or p-hydroxybenzoate, decyl o- or p-hydroxybenzoate, and dodecyl o- or p-hydroxybenzoate.

Preferred of the above-enumerated plasticizers for use as the plasticizer (C2) in the present invention include benzenesulfonic acid alkylamides such as benzenesulfonic acid butylamide and benzenesulfonic acid 2-ethylhexylamide, toluenesulfonic acid alkylamides such as N-ethyl-p-toluenesulfonic acid butylamide and N-ethyl-p-toluenesulfonic acid 2-ethylhexylamide, and alkyl hydroxybenzoates such as ethylhexyl p-hydroxybenzoate, hexyldecyl p-hydroxybenzoate, and ethyldecyl p-hydroxybenzoate.

Especially preferred of these include benzenesulfonic acid butylamide, ethylhexyl p-hydroxybenzoate, and hexyldecyl p-hydroxybenzoate.

The amount of the plasticizer mixture (C) in the first and second embodiments of the present invention is from 3 to 25 parts by weight, preferably from 5 to 22 parts by weight, especially preferably from 8 to 20 parts by weight, per 100 parts by weight of the polyamide-11 resin and/or polyamide-12 resin (A) used. If the amount thereof is smaller than 3 parts by weight, the polyamide resin composition obtained may be insufficient in flexibility and unsuitable for use in applications such as tube. If the amount thereof exceeds 25 parts by weight, the polyamide resin composition obtained may have impaired heat resistance and unsatisfactory low-temperature impact resistance. In order to avoid these undesirable phenomena without fail, the incorporation amount of the plasticizer mixture (C) should be within the preferred range, in particular within the especially preferred range.

The modified polyolefin resin (B) used in the second embodiment of the present invention is either a modified polyolefin (B1) which is a copolymer of an olefin comprising at least one of ethylene and propylene, with an α,β-unsaturated carboxylic acid or a derivative thereof, or a modified polyolefin (B2) which is a graft polymer obtained by grafting an α,β-unsaturated carboxylic acid or a derivative thereof onto a copolymer of an olefin comprising at least one of ethylene and propylene.

Examples of the olefin comprising ethylene and propylene used for producing the modified polyolefin resin (B1) include ethylene, propylene, and mixtures of ethylene and one or more α-olefins having 3 or more, especially from 3 to about 18, carbon atoms, such as an ethylene/propylene mixture, an ethylene/1-butene mixture, an ethylene/1-hexene mixture, an ethylene/4-methylpentene-1 mixture, an ethylene/1-decene mixture, and an ethylene/1-dodecene mixture. Preferred of these includes ethylene, an ethylene/propylene mixture, an ethylene/1-butene mixture, and an ethylene/1-hexene mixture. Especially preferred includes ethylene and an ethylene/propylene mixture.

Preferred examples of the α,β-unsaturated carboxylic acid or derivative thereof used as a comonomer for producing the modified polyolefin resin (B1) include acrylic acid, methacrylic acid, methylmethacrylic acid, ethylacrylic acid, maleic acid, methyl acrylate, ethyl acrylate, methyl methacrylate, ethyl methacrylate, sodium acrylate, zinc acrylate, vinyl acetate, and glycidyl methacrylate.

The α,β-unsaturated carboxylic acid or derivative thereof as a comonomer is desirably used in such an amount that in the modified polyolefin resin (B1), the units derived therefrom account for up to 40 mol %, preferably up to 20 mol %, of the whole molecular chain. If the content of the units derived from the α,β-unsaturated carboxylic acid or derivative thereof exceeds 40 mol %, the polyamide resin composition obtained undesirably tends to generate a heat decomposition gas during molding and to give a tacky molding.

Examples of the modified polyolefin resin (B1) include an ethylene/acrylic acid copolymer, an ethylene/vinyl acetate copolymer, an ethylene/methacrylic acid copolymer, an ethylene/ethylacrylic acid copolymer, an ethylene/sodium acrylate copolymer, and a maleic acid/ethylene/acrylic acid copolymer.

The olefin comprising at least one of ethylene and propylene used for grafting for producing the modified polyolefin resin (B2) may be the same as the olefin comprising at least one of ethylene and propylene used for producing the modified polyolefin resin (B1).

Examples of such olefins include copolymers of ethylene and one or more α-olefins having 3 or more, especially from 3 to about 18, carbon atoms, such as an ethylene/propylene copolymer, an ethylene/1-butene copolymer, an ethylene/1-hexene copolymer, an ethylene/4-methylpentene-1 copolymer, an ethylene/1-decene copolymer, and an ethylene/1-dodecene copolymer. However, the olefin copolymer should not be construed as being limited to these examples. Also usable are copolymers of ethylene with an α-olefin having 3 or more carbon atoms and styrene, such as an ethylene/butylene/styrene copolymer, an ethylene/propylene/styrene copolymer, and a styrene/ethylene/butylene/styrene copolymer.

Preferred of those copolymers used in producing the modified polyolefin resin (B2) in the present invention includes an ethylene/propylene copolymer, an ethylene/butylene/styrene copolymer, an ethylene/propylene/styrene copolymer, and a styrene/ethylene/butylene/styrene copolymer. Especially preferred includes an ethylene/propylene copolymer and a styrene/ethylene/butylene/styrene copolymer.

From the standpoint of the effect of improving low-temperature impact resistance, the ethylene contents of these copolymers is generally from 30 to 90 mol %, are preferably from 40 to 90 mol %, and more preferably from 60 to 90 mol %. Ethylene contents of those copolymers lower than 30 mol % are not preferred in that such copolymers have a heightened glass transition temperature and are hence less effective in improving low-temperature impact resistance. Ethylene contents thereof exceeding 90 mol % are also not preferred in that such copolymers have heightened crystallinity and impaired elastomeric properties and are hence ineffective in improving impact resistance. It is noted that when those copolymers have an ethylene content higher than 40 mol % and lower than 60 mol %, such copolymers have a tendency that they may have a heightened glass transition temperature and be insufficient in the effect of improving low-temperature impact resistance, and that this tendency is enhanced when the ethylene content thereof is higher than 30 mol % and lower than 40 mol %.

The α,β-unsaturated carboxylic acid or derivative thereof to be grafted onto the olefin copolymer described above may be the same as the α,β-unsaturated carboxylic acid or derivative thereof used as a comonomer for producing the modified polyolefin resin (B1). Examples thereof include monobasic unsaturated carboxylic acids such as acrylic acid, methacrylic acid, methylmethacrylic acid, crotonic acid, isocrotonic acid, α-ethylacrylic acid, and β-ethylacrylic acid; dibasic unsaturated carboxylic acids such as maleic acid, fumaric acid, tetrahydrophthalic acid, itaconic acid, citraconic acid, and endocis-bicyclo[2,2,1]hept-5-ene-2,3-dicarboxylic acid (trade name: nadic acid); and derivatives of these monobasic or dibasic unsaturated carboxylic acids, such as halides, amides, imides, anhydrides, salts (e.g., sodium salts and zinc salts), and esters. For example, use may be made of acrylic acid, methacrylic acid, malonyl chloride, acrylamide, maleimide, N-phenylmaleimide, N-methylmaleimide, N-ethylmaleimide, maleic anhydride, itaconic anhydride, glutaconic anhydride, citraconic anhydride, endocis-bicyclo[2,2,1]hept-5-ene-2,3-dicarboxylic anhydride (trade name: nadic anhydride), aconitic anhydride, sodium acrylate, zinc acrylate, monomethyl maleate, dimethyl maleate, glycidyl acrylate, glycidyl methacrylate, and glycidyl maleate. Of these, the anhydrides are desirable. Preferred are maleic anhydride and nadic anhydride, with maleic anhydride being especially preferred.

Methods for the graft polymerization are not particularly limited, and various conventionally known methods may be employed. For example, use may be made of a method in which a copolymer of the above-described olefin ingredient consisting mainly of ethylene and/or propylene is melted or dissolved in a solvent, and the α,β-unsaturated carboxylic acid or derivative thereof is added to the melt or solution, following which the resulting mixture is heated with stirring to conduct graft polymerization. The simplest and most efficient method is to use an extruder to graft-polymerize the α,β-unsaturated carboxylic acid or derivative thereof with a melt of the olefin copolymer. This graft polymerization can be efficiently carried out by using a free-radical generator such as, e.g., an organic peroxide or an azo compound.

The organic peroxide for use as the free-radical generator may also be an organic peracid ester or the like. Examples of such organic compounds include benzoyl peroxide, dichlorobenzoyl peroxide, dicumyl peroxide, cyclohexanone peroxide, di-tert-butyl peroxide, 2,5-dimethyl-2,5-di(peroxybenzoato)hexyne-3, 1,4-bis(tert-butylperoxyisopropyl)benzene, lauroyl peroxide, tert-butyl peracetate, 2,5-dimethyl-2,5-di(tert-butylperoxy)hexyne-3, 2,5-dimethyl-2,5-di(tert-butylperoxy)hexane, tert-butyl perbenzoate, tert-butyl perphenylacetate, tert-butyl perisobutyrate, tert-butyl per-sec-octoate, tert-butyl perpivalate, cumyl perpivalate, and tert-butyl perdiethylacetate.

Examples of the azo compound for use as the free-radical generator include azobisisobutyronitrile and dimethyl azoisobutyrate.

Of those compounds, organic peroxides are desirably used. Specifically, dialkyl peroxides such as dicumyl peroxide, di-tert-butyl peroxide, 2,5-dimethyl-2,5-di(tert-butylperoxy)hexyne-3, 2,5-dimethyl-2,5-di(tert-butylperoxy)hexane, and 1,4-bis(tert-butylperoxyisopropyl)benzene are preferred.

In the modified polyolefin resin (B2), the amount of the modifying ingredient (an α,β-unsaturated carboxylic acid or a derivative thereof) grafted onto a copolymer of the olefin ingredient consisting mainly of ethylene and/or propylene is preferably from 0.02 to 6 wt % based on the amount of the olefin copolymer. From the standpoints of compatibility with component (A), i.e., the polyamide-11 resin and/or polyamide-12 resin, and of the effect of improving impact resistance, the graft amount of the modifying ingredient is more preferably from 0.1 to 4 wt %, especially preferably from 0.2 to 2 wt %.

Graft amounts of the modifying ingredient smaller than 0.02 wt % are undesirable in that the compatibility between the polyamide-11 resin and/or polyamide-12 resin (A) and the modified polyolefin resin (B2) is reduced and, as a result, the resin composition obtained sometimes tends to give a molding having a poor appearance and insufficient impact resistance. If the graft amount of the modifying ingredient exceeds 6 wt %, the modified polyolefin resin (B2) has too high a degree of crosslinking and, hence, the impact resistance of the resin composition obtained is not so improved. In order to avoid these undesirable phenomena without fail, the graft amount of the modifying ingredient is preferably within the preferred range specified about, in particular within the especially preferred range.

The amount of the modified polyolefin resin (B1) or the modified polyolefin resin (B2) used in the present invention is from 3 to 30 parts by weight, preferably from 3 to 20 parts by weight, per 100 parts by weight of the polyamide-11 resin and/or polyamide-12 resin (A) used.

Amounts thereof smaller than 3 parts by weight are undesirable in that the effect of improving the low-temperature impact resistance of the resin composition obtained may be insufficient. In the case where the modified polyolefin resin (B1) or the modified polyolefin resin (B2) is used in combination with the plasticizer mixture (C) described above, the resin (B1) or (B2) can be incorporated in an amount up to 30 parts by weight, which is the upper limit as show above, and preferably up to 20 parts by weight, without causing problems such as insufficient melt elongation and the difficulty of dimensional control due to considerable die swelling when the resin composition obtained is subjected to high-speed (e.g., 30 m/min or higher, in particular 50 m/min or higher) molding for producing a tube or the like. If the amount of the resin (B1) or (B2) exceeds 30 parts by weight, there are cases where the problems described above are encountered in high-speed molding for producing a tube or the like, and where the resin composition obtained cannot have the heat resistance inherent in the polyamide-11 resin and/or polyamide-12 resin (A) and is hence unsuitable for use in some applications.

Various additives ordinarily added to resin compositions may be incorporated into the resin compositions of the first and second embodiments of the present invention as long as the objects of the invention are not defeated. Examples thereof include weathering agents such as antioxidants of the phenol, thioether, phosphite, amine, and other types, heat stabilizers of the organotin, lead compound, metal soap, and other types, and ultraviolet absorbers of the salicylate, benzophenone, benzotriazole, cyanoacrylate, metal complex, and other types; antistatic agents such as alkylamines, alkylamides, alkyl ethers, alkylphenyl ethers, glycerol/fatty acid esters, sorbitan/fatty acid esters, alkylsulfonates, alkylbenzenesulfonates, alkylsulfates, alkylphosphates, quaternary ammonium salts, and alkylbetaines; inorganic flame retardants such as red phosphorus, tin oxide, zirconium hydroxide, barium metaborate, aluminum hydroxide, and magnesium hydroxide; organic flame retardants of the halogen compound, phosphoric ester, melamine, and cyanuric acid types; flame retardant aids such as antimony trioxide; and other additives such as nucleating agents, gellants, lubricants, pigments, and dyes.

For obtaining the polyamide resin composition of the present invention, various methods which themselves are known may be used without particular limitations. For example, a method can be employed in which the polyamide-11 resin and/or polyamide-12 resin (A) is dry-blended beforehand with the plasticizer mixture (C) (and optionally with the modified polyolefin resin (B1) or (B2) in the second embodiment) in respective amounts within the ranges shown hereinabove by means of a low-speed rotary mixer, e.g., a twin-cylinder mixer or a tumbler, or a high-speed rotary mixer, e.g., a Henschel mixer, and the blend is melt-kneaded with a single-screw extruder, twin-screw extruder, twin-screw kneader, or the like and then granulated. Alternatively, a method can be employed in which the polyamide-11 resin and/or polyamide-12 resin (A) is optionally dry-blended beforehand with the modified polyolefin resin (B1) or (B2) in respective amounts within the ranges shown hereinabove by means of a low-speed or high-speed rotary mixer such as those mentioned above, and is then melt-kneaded with a single-screw extruder, twin-screw extruder, twin-screw kneader, or the like while adding the plasticizer mixture (C) thereto in an amount within the range shown hereinabove by feeding the mixture (C) to the cylinder of the melting kneader at a part thereof between its ends, following which the resulting mixture is kneaded and then granulated.

In the case where the plasticizer mixture (C) is liquid at ordinary temperature, the latter method is desirably employed.

The plasticizer mixture (C) to be added in an amount within the given range may be prepared by mixing the plasticizer (C1) with the plasticizer (C2) in a proportion within the given range by means of a rotary mixer equipped with stirring blades of the propeller, turbine, paddle, or another type or a line mixer, e.g., an orifice or nozzle type mixer or an injector, before being dry-blended with the polyamide-11 resin and/or polyamide-12 resin (A) and optionally further with the modified polyolefin resin (B1) or (B2), or before being fed to the cylinder of the melting kneader at a part thereof between its ends. However, methods for the preparation of the plasticizer mixture (C) should not be construed as being limited thereto. It is also possible to separately feed the plasticizer (C1) and the plasticizer (C2) in a proportion within the given range in such respective amounts as to result in an incorporation amount of the plasticizer mixture (C) within the given range, during the dry-blending thereof with the polyamide-11 resin and/or polyamide-12 resin (A) and optionally further with the modified polyolefin resin (B1) or (B2) or during the feeding thereof to the cylinder of the melting kneader at a part thereof between its ends.

According to the present invention, a tubular molding comprising the polyamide resin composition of the present invention is formed by a known method. For example, an extruder equipped at its tip with a die having a cylindrical resin passageway is used to extrude the plasticated and melted polyamide resin composition, and the resulting tubular extrudate of the molten resin composition is introduced through an appropriate air gap into a sizing former, where the tubular extrudate is solidified by cooling, regulated to have fixed sizes with respect to outer diameter, wall thickness, etc., subsequently introduced into a water tank or the like to be sufficiently cooled, and then taken off with a belt type takeoff machine.

In this case, the vacuum sizing method is preferably employed in which the size former is set in a vacuum water tank to conduct cooling and size fixing.

In forming the tubular molding according to the present invention, the molding speed is preferably 30 m/min or higher, more preferably 50 m/min or higher. Molding speeds lower than 30 m/min are undesirable in that the efficiency of tubular-molding production is extremely low. Molding speeds exceeding 30 m/min and lower than 50 m/min are somewhat disadvantageous in the efficiency of tubular-molding production.

The present invention will be explained below in more detail by reference to Examples and Comparative Examples, but the invention should not be construed as being limited to these Examples unless the spirit thereof is departed from. All the parts and percents are by weight unless otherwise indicated.

The methods employed in the following Examples and Comparative Examples for evaluating test pieces of polyamide resin compositions and tubular moldings (hereinafter referred to simply as "tubes") thereof for various properties are as follows.

(1) Flexural Modulus

Using test pieces having a prescribed size, measurement was made at 23° C. in accordance with ASTM D790.

(2) Izod Impact Strength

Using notched test pieces having a thickness of ½ inch, measurement was made at −40° C. in accordance with ASTM D256.

(3) Low-Temperature Impact Test for Tube

In accordance with SAE J844, tubes having the prescribed size were allowed to stand at −40° C. for 4 hours or longer, following which a weight of 0.454 kg was dropped thereonto from a height of 304.8 mm. Whether the tubes suffered cracking was then visually judged. The results of tube fracture shown in Table 1 are given in terms of the ratio of (the number of tubes fractured)/(the number of tubes tested).

(4) Tube Surface Tackiness

A tube obtained by molding a given polyamide resin composition under the molding conditions described later was exposed to an 80° C. and 760 mmHg atmosphere for 16 hours and subsequently allowed to stand at room temperature for 168 hours, following which the surface tackiness of the tube was judged based on touch. The results of tube tackiness evaluation shown in Table 1 have the following meaning.

A: free from tackiness
B: slightly tacky
C: tacky (5) Tube-Moldable Speed

A single-screw extruder with a diameter of 40 mm (manufactured by Ikegai Co., Ltd., Japan; Type FS40; screw length (L) to screw diameter (D) ratio (L/D), 28), a straight die for tube having a die/mandrel size of 7.8/5.0 mm, and a sizing former having an inner diameter of 3.6 mm and an introduction angle of 20 degrees were arranged in predetermined positions. Thereafter, pellets of a given polyamide resin composition were fed to the above single-screw extruder to mold a tube of the polyamide resin composition having an outer diameter of 3 mm and an inner diameter of 2 mm under the conditions of an extruder cylinder temperature of 180° to 210° C., a resin temperature of 210° C., an air gap of 50 mm, a water temperature in the vacuum water tank of 10° C., and a degree of vacuum therein of 10 to 400 mmHg. In this operation, the molding speed was gradually increased from 5 m/min to determine the maximum speed at which the resin melt could be molded without breaking in the space between the die and the sizing former (i.e., within the air gap).

The abbreviations used in Tables 1 and 2 for indicating the kinds of the polyamide resin (A), the modified polyolefin resin (B), the plasticizer (C1), and the plasticizer (C2) represent the following ingredients.

Polyamide Resin (A)
  11: polyamide-11 resin
  12: polyamide-12 resin

Modified Polyolefin Resin (B)
  m-EPR: ethylene/propylene copolymer modified by maleic acid grafting
  m-SEBS: styrene/ethylene/butylene/styrene copolymer modified by maleic acid grafting
  MEA: maleic acid/ethylene/acrylic acid copolymer Plasticizer (C1)
  DIDP: diisodecyl phthalate
  DOP: di-2-ethylhexyl phthalate
  DOA: di-2-ethylhexyl adipate
  KM: 2,2,4-trimethyl-1,3-pentanediol monoisobutyrate
  TOP: tri-2-ethylhexyl phosphate Plasticizer (C2)
  BSBA: benzenesulfonic acid butylamide
  HDPB: hexyldecyl p-hydroxybenzoate
  EHPB: ethylhexyl p-hydroxybenzoate

EXAMPLES 1 TO 9

In each Example, the plasticizers (C1) and (C2) shown in Table 1 were mixed with each other beforehand in the proportion (weight ratio) shown in Table 1 (for example, in Example 1, the proportion of di-2-ethylhexyl phthalate (DOP) to benzenesulfonic acid butylamide (BSBA) was 70 wt %/30 wt %) using a rotary mixer equipped with propeller type stirring blades to obtain a plasticizer mixture (C).

Subsequently, the polyamide resin (A) shown in Table 1 was fed to a twin-screw melting kneader (manufactured by Ikegai Co., Ltd.; Type PCM30) in the amount shown in Table 1, during which the plasticizer mixture (C) prepared above was injected into the cylinder of the twin-screw melting kneader at a part thereof between its ends in the amount shown in Table 1 by means of a constant delivery pump. The resulting mixture was melted and kneaded at a cylinder temperature of 180° to 250° C., and the melt was extruded in the form of a strand. This extrudate was introduced into a water tank, cooled therein, pelletized, and then dried to obtain pellets of a polyamide resin composition.

The pellets thus obtained were injection-molded with an injection molding machine under the conditions of a cylinder temperature of 210° C. and a mold temperature of 60° C. to produce test pieces for the measurements of flexural modulus and Izod impact strength. Further, a 40-mmφ single-screw extruder (manufactured by Ikegai Co., Ltd.; Type FS40; screw length (L) to screw diameter (D) ratio (L/D), 28), a straight die for tube having a die/mandrel size of 7.8/5.0 mm, and a sizing former having an inner diameter of 3.6 mm and an introduction angle of 20 degrees were arranged in predetermined positions. Thereafter, pellets of each polyamide resin composition obtained above were fed to the 40-mmφ single-screw extruder. Molding was conducted under the conditions of an extruder cylinder temperature of 180° to 210° C., a water temperature in the vacuum tank of 10° C., and a degree of vacuum therein of 10 to 400 mmHg, while taking off the extrudate with a belt type takeoff machine at a rate of 50 m/min. Thus, tubes of the polyamide resin composition having an outer diameter of 3 mm and an inner diameter of 2 mm were molded.

The test pieces and tubes thus obtained in each Example were evaluated for properties by the methods described above. The results obtained are shown in Table 1.

COMPARATIVE EXAMPLES 1 AND 2

In each Comparative Example, 100 parts by weight of a polyamide-12 resin (A) was fed to the same twin-screw melting kneader as in Example 1, during which 10 parts by weight of the plasticizer (C2) shown in Table 1 was injected into the cylinder of the twin-screw melting kneader at a part thereof between its ends by means of a constant delivery pump. The resulting mixture was melted and kneaded at a cylinder temperature of 180° to 250° C., and the melt was extruded in the form of a strand. This extrudate was introduced into a water tank, cooled therein, pelletized, and then dried to obtain pellets of a polyamide resin composition.

The pellets thus obtained were used to produce test pieces for the measurements of flexural modulus and Izod impact strength and tubes for the low-temperature impact test in the same manner as in Example 1.

The test pieces and tubes thus obtained were evaluated for properties by the methods described above. The results obtained are shown in Table 1.

COMPARATIVE EXAMPLE 3

The same procedure as in Example 1 was carried out, except that the proportion (weight ratio) of the plasticizer (C1) to the plasticizer (C2) was changed from DOP/BSBA=70 wt %/30 wt % to DOP/BSBA=50 wt %/50 wt %. Thus, test pieces for the measurements of flexural modulus and Izod impact strength and tubes for the low-temperature impact test were produced.

The test pieces and tubes thus obtained were evaluated for properties by the methods described above. The results obtained are shown in Table 1.

COMPARATIVE EXAMPLE 4

The same procedure as in Comparative Example 3 was carried out, except that ethylhexyl p-hydroxybenzoate (EHPB) was used as a plasticizer (C2) in place of BSBA, and that the amount of the plasticizer mixture (C) injected into the cylinder of the twin-screw melting kneader at a part thereof between its ends was changed from 10 parts by weight to 20 parts by weight. Thus, test pieces for the measurements of flexural modules and Izod impact strength and tubes for the low-temperature impact test were produced.

The test pieces and tubes thus obtained were evaluated for properties by the methods described above. The results obtained are shown in Table 1.

COMPARATIVE EXAMPLE 5

The same procedure as in Example 1 was carried out, except that diisodecyl phthalate (hereinafter abbreviated as "DIDP") was used as a plasticizer (C1) in place of DOP, that hexyldecyl p-hydroxybenzoate (hereinafter abbreviated as "HDPB") was used as a plasticizer (C2) in place of BSBA, and that the proportion (weight ratio) of the plasticizer (C1) to the plasticizer (C2) was changed from DOP/BSBA=70 wt %/30 wt % to DIDP/HDPB=20 wt %/80 wt %. Thus, test pieces for the measurements of flexural modulus and Izod impact strength and tubes for the low-temperature impact test were produced.

The test pieces and tubes thus obtained were evaluated for properties by the methods described above. The results obtained are shown in Table 1.

COMPARATIVE EXAMPLE 6

The same procedure as in Comparative Example 3 was carried out, except that 2,2,4-trimethyl-1,3-pentanediol monoisobutyrate was used as a plasticizer (C1) in place of DOP. Thus, test pieces for the measurements of flexural modulus and Izod impact strength and tubes for the low-temperature impact test were produced.

The test pieces and tubes thus obtained were evaluated for properties by the methods described above. The results obtained are shown in Table 1.

In Comparative Examples 1 to 6, the polyamide resin compositions obtained had an Izod impact strength as low as from 3.5 to 4.3 kg·cm/cm. In the low-temperature impact test for tube in each Comparative Example, all the tubes subjected to the test fractured.

TABLE 1

| | Polyamide resin (A) | | Plasticizer mixture (C) | | |
|---|---|---|---|---|---|
| | | | | Proportion | |
| | Kind | Amount (part) | Kind (C1)/(C2) | of (C1)/(C2) (wt %/wt %) | Amount (part) |
| Example 1 | 12 | 100 | DOP/BSBA | 70/30 | 10 |
| Example 2 | 12 | 100 | DIDP/BSBA | 80/20 | 10 |
| Example 3 | 12 | 100 | DIDP/BSBA | 80/20 | 25 |
| Example 4 | 12 | 100 | DIDP/BSBA | 90/10 | 10 |
| Example 5 | 12 | 100 | DIDP/HDPB | 70/30 | 20 |
| Example 6 | 12 | 100 | DOA/HDPB | 80/20 | 10 |

TABLE 1-continued

| | | | | | |
|---|---|---|---|---|---|
| Example 7 | 12 | 100 | TOP/EHPB | 80/20 | 20 |
| Example 8 | 12 | 100 | KW/HDPB | 60/40 | 5 |
| Example 9 | 11 | 100 | DOA/HDPB | 80/20 | 10 |
| Comparative Example 1 | 12 | 100 | —/HDPB | 0/100 | 10 |
| Comparative Example 2 | 12 | 100 | —/BSBA | 0/100 | 10 |
| Comparative Example 3 | 12 | 100 | DOP/BSBA | 50/50 | 10 |
| Comparative Example 4 | 12 | 100 | DOP/EHPB | 50/50 | 20 |
| Comparative Example 5 | 12 | 100 | DIDP/HDPB | 20/80 | 10 |
| Comparative Example 6 | 12 | 100 | KM/BSBA | 50/50 | 10 |

| | Low-temperature impact strength (−40° C.) | | Flexibility |
|---|---|---|---|
| | Izod impact strength (kg·cm/cm) | Tube fracture*1 | Flexural modulus (kg/cm²) |
| Example 1 | 5.4 | 0/10 | 5,800 |
| Example 2 | 7.3 | 0/10 | 6,800 |
| Example 3 | 9.3 | 0/10 | 5,500 |
| Example 4 | 10.6 | 0/10 | 7,300 |
| Example 5 | 6.8 | 0/10 | 7,400 |
| Example 6 | 12.1 | 0/10 | 7,000 |
| Example 7 | 8.8 | 0/10 | 5,200 |
| Example 8 | 6.7 | 0/10 | 7,800 |
| Example 9 | 7.2 | 0/10 | 5,600 |
| Comparative Example 1 | 3.6 | 10/10 | 5,400 |
| Comparative Example 2 | 3.5 | 10/10 | 4,900 |
| Comparative Example 3 | 4.2 | 10/10 | 5,000 |
| Comparative Example 4 | 4.3 | 10/10 | 5,500 |
| Comparative Example 5 | 3.3 | 10/10 | 6,000 |
| Comparative Example 6 | 4.3 | 10/10 | 4,800 |

Note:
*1 The number of tubes fractured per the number of tube tested

EXAMPLES 10 TO 20

In each Example, the plasticizers (C1) and (C2) shown in Table 2 were mixed with each other beforehand in the proportion (weight ratio) shown in Table 2 (for example, in Example 10, the proportion of 2,2,4-trimethyl-1,3-pentanediol monoisobutyrate (KM) to benzenesulfonic acid butylamide (BSBA) was 50 wt %/50 wt %) using a rotary mixer equipped with propeller type stirring blades to obtain a plasticizer mixture (C).

Subsequently, the polyamide resin (A) and the modified polyolefin resin (B) each shown in Table 2 were fed to a twin-screw melting kneader (manufactured by Ikegai Co., Ltd.; Type PCM30) in the respective amounts shown in Table 2, during which the plasticizer mixture (C) prepared above was injected into the cylinder of the twin-screw melting kneader at a part thereof between its ends in the amount shown in Table 2 by means of a constant delivery pump. The resulting mixture was melted and kneaded at a cylinder temperature of 180° to 250° C., and the melt was extruded in the form of a strand. This extrudate was introduced into a water tank, cooled therein, pelletized, and then dried to obtain pellets of a polyamide resin composition.

The pellets thus obtained were injection-molded with an injection molding machine under the conditions of a cylinder temperature of 210° C. and a mold temperature of 60° C. to produce test pieces for the measurements of flexural modulus and Izod impact strength. Further, a 40-mmφ single-screw extruder (manufactured by Ikegai Co., Ltd.; Type FS40; L/D=28), a straight die for tube having a die/mandrel size of 7.8/5.0 mm, and a sizing former having an inner diameter of 3.6 mm and an introduction angle of 20 degrees were arranged in predetermined positions. Thereafter, pellets of each polyamide resin composition obtained above were fed to the 40-mmφ single-screw extruder. Molding was conducted under the conditions of an extruder cylinder temperature of 180° to 210° C., a water temperature in the vacuum tank of 10° C., and a degree of vacuum therein of 10 to 400 mmHg, while taking off the extrudate with a belt type takeoff machine at a rate of 30 m/min. Thus, tubes of the polyamide resin composition having an outer diameter of 3 mm and an inner diameter of 2 mm were molded.

The test pieces and tubes thus obtained in each Example were evaluated for properties by the methods described above. The results obtained are shown in Table 2.

COMPARATIVE EXAMPLES 7 AND 8

In each Comparative Example, 100 parts by weight of a polyamide-12 resin (A) and an ethylene/propylene copolymer modified by maleic acid grafting (m-EPR) in the amount shown in Table 2 were fed to the same twin-screw melting kneader as in Example 10, during which the plasticizer (C2) shown in Table 2 was injected in the amount shown in Table 2 into the cylinder of the twin-screw melting kneader at a part thereof between its ends by means of a constant delivery pump. The resulting mixture was melted and kneaded at a cylinder temperature of 180° to 250° C., and the melt was extruded in the form of a strand. This extrudate was introduced into a water tank, cooled therein, pelletized, and then dried to obtain pellets of a polyamide resin composition.

The pellets thus obtained were used to produce test pieces for the measurements of flexural modulus and Izod impact strength and tubes for the low-temperature impact test in the same manner as in Example 10.

The test pieces and tubes thus obtained were evaluated for properties by the methods described above. The results obtained are shown in Table 2. In the Comparative Examples, the polyamide resin compositions obtained had an Izod impact strength as low as 9.7 kg·cm/cm (Comparative Example 7) and 7.1 kg·cm/cm (Comparative Example 8). Further, in the low-temperature impact test for tube, a large proportion of the tubes fractured as shown in Table 2.

COMPARATIVE EXAMPLE 9

The same procedure as in Example 10 was carried out, except that m-EPR as a modified polyolefin resin (B) was omitted, and that the amount of the plasticizer mixture (C) was changed from 5 parts by weight to 20 parts by weight. Thus, test pieces for the measurements of flexural modulus and Izod impact strength and tubes for the low-temperature impact test were produced.

The test pieces and tubes thus obtained were evaluated for properties by the methods described above. The results obtained are shown in Table 2. The polyamide resin composition obtained had an Izod impact strength as low as 4.3 kg·cm/cm. In the low-temperature impact test for tube, all the tubes fractured.

COMPARATIVE EXAMPLE 10

The same procedure as in Example 14 was carried out, except that the amount of m-EPR as a modified polyolefin resin (B) was changed from 10 parts by weight to 35 parts by weight, and that the amount of the plasticizer mixture (C) was changed from 20 parts by weight to 10 parts by weight. Thus, test pieces for the measurements of flexural modulus and Izod impact strength and tubes for the low-temperature impact test were produced.

The test pieces and tubes thus obtained were evaluated for properties by the methods described above. The results obtained are shown in Table 2. The polyamide resin composition had a tube-moldable speed as low as 10 m/min, and was hence unable to satisfy the high-speed tube moldability which is one of the properties required in the present invention.

Since the tube-moldable speed of the composition in this Comparative Example was 10 m/min, tubes were unable to be obtained at a molding speed of 30 m/min and, hence, the low-temperature impact test for tube was not performed.

TABLE 2

| | Polyamide resin (A) | | Modified polyolefin resin (B) | | Plasticizer mixture (C) | | |
|---|---|---|---|---|---|---|---|
| | | | | | | Proportion | |
| | Kind | Amount (part) | Kind | Amount (part) | Kind (C1)/(C2) | of (C1)/(C2) (wt %/wt %) | Amount (part) |
| Example 10 | 12 | 100 | m-EPR | 5 | KM/BSBA | 50/50 | 5 |
| Example 11 | 12 | 100 | m-EPR | 10 | KM/BSBA | 50/50 | 20 |
| Example 12 | 12 | 100 | m-SEBS | 5 | DOA/BSBA | 50/50 | 10 |
| Example 13 | 12 | 100 | m-EPR | 5 | TOP/EHPB | 50/50 | 10 |
| Example 14 | 12 | 100 | m-EPR | 10 | DOP/HDPB | 50/50 | 20 |
| Example 15 | 12 | 100 | m-EPR | 20 | DIDP/BSBA | 50/50 | 10 |
| Example 16 | 12 | 100 | m-EPR | 25 | DIDP/BSBA | 50/50 | 10 |
| Example 17 | 12 | 100 | MEA | 10 | DIDP/BSBA | 50/50 | 15 |
| Example 18 | 12 | 100 | m-EPR | 10 | DIDP/HDPB | 20/80 | 10 |
| Example 19 | 12 | 100 | m-EPR | 10 | DIDP/HDPB | 50/50 | 10 |
| Example 20 | 12 | 100 | m-EPR | 10 | DIDP/HDPB | 80/20 | 10 |
| Example 21 | 11 | 100 | m-EPR | 10 | DIDP/BSBA | 50/50 | 10 |
| Comparative Example 7 | 12 | 100 | m-EPR | 10 | —/EHPB | 0/100 | 20 |
| Comparative Example 8 | 12 | 100 | m-EPR | 5 | —/BSBA | 0/100 | 10 |
| Comparative Example 9 | 12 | 100 | m-EPR | 0 | KM/BSBA | 50/50 | 20 |
| Comparative Example 10 | 12 | 100 | m-EPR | 35 | DOP/HDPB | 50/50 | 10 |

| | Low-temperature impact resistance (−40° C.) | | Flexy-bility | Heat resistance | |
|---|---|---|---|---|---|
| | Izod impact strength (kg · cm/cm) | Tube fracture*[1] | Flexural modulus (kg/cm$^2$) | Tube surface tackiness | Moldabilty Moldable speed (m/min) |
| Example 10 | 11.8 | 0/10 | 8,600 | A | ≧80 |
| Example 11 | 15.8 | 0/10 | 4,000 | A | ≧80 |
| Example 12 | 13.5 | 0/10 | 6,000 | A | ≧80 |
| Example 13 | 13.8 | 0/10 | 5,800 | A | ≧80 |
| Example 14 | 15.6 | 0/10 | 5,000 | A | ≧80 |
| Example 15 | 22.2 | 0/10 | 5,100 | A | 60 |
| Example 16 | 25.6 | 0/10 | 4,800 | A | 40 |
| Example 17 | 16.2 | 0/10 | 3,800 | A | ≧80 |
| Example 18 | 16.5 | 0/10 | 5,800 | A | ≧80 |
| Example 19 | 17.6 | 0/10 | 6,400 | A | ≧80 |
| Example 20 | 19.2 | 0/10 | 7,300 | A | ≧80 |
| Example 21 | 21.3 | 0/10 | 4,900 | A | ≧80 |
| Comparative Example 7 | 9.7 | 7/10 | 4,200 | A | ≧80 |
| Comparative Example 8 | 7.1 | 10/10 | 5,000 | A | ≧80 |
| Comparative Example 9 | 3.7 | 10/10 | 4,200 | A | ≧80 |
| Comparative Example 10 | 41.2 | —*[2] | 4,700 | A | 10 |

Note:
*[1]The number of tubes fractured per the number of tube tested
*[2]The low-temperature impact test was omitted.

As apparent from the Examples and Comparative Examples given above, since the polyamide resin composition of the present invention comprises a polyamide-11 resin and/or a polyamide-12 resin and incorporated therein a specific amount of a plasticizer mixture comprising two specific plasticizers at a specific ratio, it retains flexibility and low-temperature impact resistance and has sufficient high-speed moldability in the production of tube or the like. The tubular molding of the present invention obtained by molding the polyamide resin composition at a rate as high as 30 m/min or higher, in particular 50 m/min or higher, has sufficient low-temperature impact resistance.

Furthermore, moldings obtained from the polyamide resin composition of the present invention through a high-speed molding operation, e.g., the tubular molding of the invention, do never become tacky or hardened even when exposed to a high-temperature atmosphere for long.

Consequently, the polyamide resin composition of the present invention is extremely useful as a material for various pneumatic or hydraulic tubes for automotive and other uses, while the tubular molding comprising the polyamide resin composition of the present invention is extremely useful as such various pneumatic or hydraulic tubes.

While the invention has been described in detail and with reference to specific embodiments thereof, it will be apparent to one skilled in the art that various changes and modifications can be made therein without departing from the spirit and scope thereof.

What is claimed is:

1. A polyamide resin composition comprising:
   (A) 100 parts by weight of at least one member selected from a polyamide-11 resin and a polyamide-12 resin; and
   (C) from 3 to 25 parts by weight of a plasticizer mixture comprising from 60 to 95 wt % of a plasticizer (C1) and from 5 to 40 wt % of a plasticizer (C2), based on the total amount of said plasticizer mixture (C),
   said plasticizer (C1) having a solidifying point of −40° C. or lower and being at least one member selected from the group consisting of phthalic esters, fatty acid esters, polyhydric alcohol esters, phosphoric esters, trimellitic esters, and epoxy plasticizers, and
   said plasticizer (C2) being at least one member selected from the group consisting of benzenesulfonic acid alkylamides, toluenesulfonic acid alkylamides, and alkyl hydroxybenzoates.

2. A polyamide resin composition as claimed in claim 1, wherein said composition comprises 100 parts by weight of said at least one member selected from a polyamide-11 resin and a polyamide-12 resin (A) and from 5 to 22 parts by weight of said plasticizer mixture (C).

3. A polyamide resin composition as claimed in claim 2, wherein said composition comprises 100 parts by weight of said at least one member selected from a polyamide-11 resin and a polyamide-12 resin (A) and from 8 to 20 parts by weight of said plasticizer mixture (C).

4. A polyamide resin composition as claimed in claim 1, wherein said plasticizer mixture (C) comprises from 65 to 95 wt % of said plasticizer (C1) and from 5 to 35 wt % of said plasticizer (C2), based on the total amount of said plasticizer mixture (C).

5. A polyamide resin composition as claimed in claim 4, wherein said plasticizer mixture (C) comprises from 70 to 95 wt % of said plasticizer (C1) and from 5 to 30 wt % of said plasticizer (C2), based on the total amount of said plasticizer mixture (C).

6. A polyamide resin composition comprising:
   (A) 100 parts by weight of at least one member selected from a polyamide-11 resin and a polyamide-12 resin;
   (B) from 3 to 30 parts by weight of a modified polyolefin resin; and
   (C) from 3 to 25 parts by weight of a plasticizer mixture comprising from 5 to 95 wt % of a plasticizer (C1) and from 5 to 95 wt % of a plasticizer (C2), based on the total amount of said plasticizer mixture (C),
   said modified polyolefin resin (B) being either a modified polyolefin (B1) which is a copolymer of an olefin comprising at least one of ethylene and propylene, with an α,β-unsaturated carboxylic acid or a derivative thereof, or a modified polyolefin (B2) which is a graft polymer obtained by grafting an α,β-unsaturated carboxylic acid or a derivative thereof onto a copolymer of an olefin comprising at least one of ethylene and propylene,
   said plasticizer (C1) having a solidifying point of −40° C. or lower and being at least one member selected from the group consisting of phthalic esters, fatty acid esters, polyhydric alcohol esters, phosphoric esters, trimellitic esters, and epoxy plasticizers, and
   said plasticizer (C2) being at least one member selected from the group consisting of benzenesulfonic acid alkylamides, toluenesulfonic acid alkylamides, and alkyl hydroxybenzoates.

7. A polyamide resin composition as claimed in claim 6, wherein said composition comprises 100 parts by weight of said at least one member selected from a polyamide-11 resin and a polyamide-12 resin (A); from 3 to 20 parts by weight of said modified polyolefin resin (B); and from 5 to 22 parts by weight of said plasticizer mixture (C).

8. A polyamide resin composition as claimed in claim 7, wherein said composition comprises 100 parts by weight of said at least one member selected from a polyamide-11 resin and a polyamide-12 resin (A); from 5 to 20 parts by weight of said modified polyolefin resin (B); and from 8 to 20 parts by weight of said plasticizer mixture (C).

9. A polyamide resin composition as claimed in claim 6, wherein said plasticizer mixture (C) comprises from 5 to 80 wt % of said plasticizer (C1) and from 20 to 95 wt % of said plasticizer (C2), based on the total amount of said plasticizer mixture (C).

10. A polyamide resin composition as claimed in claim 9, wherein said plasticizer mixture (C) comprises from 5 to 60 wt % of said plasticizer (C1) and from 40 to 95 wt % of said plasticizer (C2), based on the total amount of said plasticizer mixture (C).

11. A tubular molding which comprises a polyamide resin composition comprising:
   (A) 100 parts by weight of at least one member selected from a polyamide-11 resin and a polyamide-12 resin; and
   (C) from 3 to 25 parts by weight of a plasticizer mixture comprising from 60 to 95 wt % of a plasticizer (C1) and from 5 to 40 wt % of a plasticizer (C2), based on the total amount of said plasticizer mixture (C),
   said plasticizer (C1) having a solidifying point of −40° C. or lower and being at least one member selected from the group consisting of phthalic esters, fatty acid esters, polyhydric alcohol esters, phosphoric esters, trimellitic esters, and epoxy plasticizers, and
   said plasticizer (C2) being at least one member selected from the group consisting of benzenesulfonic acid alkylamides, toluenesulfonic acid alkylamides, and alkyl hydroxybenzoates.

12. A tubular molding as claimed in claim 11, wherein said tubular molding is obtained at a molding speed of 30 m/min or higher.

13. A tubular molding as claimed in claim 12, wherein said tubular molding is obtained at a molding speed of 50 m/min or higher.

14. A tubular molding which comprises a polyamide resin composition comprising:
   (A) 100 parts by weight of at least one member selected from a polyamide-11 resin and a polyamide-12 resin;
   (B) from 3 to 30 parts by weight of a modified polyolefin resin; and
   (C) from 3 to 25 parts by weight of a plasticizer mixture comprising from 5 to 95 wt % of a plasticizer (C1) and from 5 to 95 wt % of a plasticizer (C2), based on the total amount of said plasticizer mixture (C),
   said modified polyolefin resin (B) being either a modified polyolefin (B1) which is a copolymer of an olefin comprising at least one of ethylene and propylene, with an α,β-unsaturated carboxylic acid or a derivative thereof, or a modified polyolefin (B2) which is a graft polymer obtained by grafting an α,β-unsaturated carboxylic acid or a derivative thereof onto a copolymer of an olefin comprising at least one of ethylene and propylene,
   said plasticizer (C1) having a solidifying point of −40° C. or lower and being at least one member selected from the group consisting of phthalic esters, fatty acid esters, polyhydric alcohol esters, phosphoric esters, trimellitic esters, and epoxy plasticizers, and
   said plasticizer (C2) being at least one member selected from the group consisting of benzenesulfonic acid alkylamides, toluenesulfonic acid alkylamides, and alkyl hydroxybenzoates.

15. A tubular molding as claimed in claim 14, wherein said tubular molding is obtained at a molding speed of 30 m/min or higher.

16. A tubular molding as claimed in claim 15, wherein said tubular molding is obtained at a molding speed of 50 m/min or higher.

* * * * *